United States Patent
Spears et al.

(10) Patent No.: US 6,455,148 B1
(45) Date of Patent: Sep. 24, 2002

(54) COMPOSITE PANEL WITH A FOAMED PLASTIC CORE

(75) Inventors: Robert Preston Spears, Richmond; Burwell Lewis Lafoon, Jr., Glen Allen; Joe C. Peace, Jr., Mechanicsville, all of VA (US); Karl-Heinz Johannes Reilmann, Eastman, GA (US)

(73) Assignee: Reynolds Metals Company, Richmond, VA (US)

( * ) Notice: Subject to any disclaimer, the term of this patent is extended or adjusted under 35 U.S.C. 154(b) by 78 days.

(21) Appl. No.: 09/613,337

(22) Filed: Jul. 7, 2000

(51) Int. Cl.$^7$ .................................................. B32B 3/00

(52) U.S. Cl. ........................... 428/319.1; 428/315.5; 428/315.7; 428/315.9; 428/317.1; 428/317.7; 428/318.4

(58) Field of Search ................ 428/318.4, 319.1, 428/317.1, 317.7, 315.5, 315.7, 315.9

(56) References Cited

U.S. PATENT DOCUMENTS

| | | | |
|---|---|---|---|
| 3,499,819 A | * | 3/1970 | Lewis .......................... 161/161 |
| 3,785,103 A | * | 1/1974 | Turner .......................... 52/309 |
| 3,970,502 A | * | 7/1976 | Turner .......................... 156/310 |
| 4,022,947 A | | 5/1977 | Grubb et al. |
| 4,128,369 A | | 12/1978 | Kemerer et al. |
| 4,157,422 A | | 6/1979 | Sturwold, et al. |
| 4,163,351 A | | 8/1979 | Ishikawa |
| 4,267,221 A | | 5/1981 | Ishikawa |
| 4,290,248 A | | 9/1981 | Kemerer et al. |
| 4,314,036 A | | 2/1982 | Throne et al. |
| 4,610,115 A | | 9/1986 | Thompson, Jr. |
| 4,620,939 A | * | 11/1986 | Maeda et al. .......... 252/301.17 |
| 4,623,584 A | | 11/1986 | Masui et al. |
| 4,685,263 A | | 8/1987 | Ting |
| 4,691,489 A | | 9/1987 | Shea, Jr. |
| 4,870,793 A | | 10/1989 | Tomlinson |
| 4,888,234 A | | 12/1989 | Smith et al. |
| 4,965,037 A | | 10/1990 | Weaver et al. |
| 5,064,707 A | | 11/1991 | Weaver et al. |
| 5,089,076 A | | 2/1992 | Leach et al. |
| 5,155,958 A | | 10/1992 | Huff |
| 5,189,537 A | | 2/1993 | O'Farrel |
| 5,212,914 A | | 5/1993 | Martin et al. |
| 5,250,578 A | | 10/1993 | Cornwell |
| 5,300,174 A | | 4/1994 | Leach et al. |
| 5,372,863 A | | 12/1994 | Nishikawa |
| 5,480,498 A | | 1/1996 | Beaudoin et al. |
| 5,503,689 A | | 4/1996 | Ward, et al. |
| 5,566,517 A | | 10/1996 | Ishii et al. |
| 5,598,674 A | | 2/1997 | Lay et al. |
| 5,679,432 A | | 10/1997 | Holmquest et al. |
| 5,698,604 A | | 12/1997 | Kiley |
| 5,938,274 A | * | 8/1999 | Ehrlich ........................ 296/191 |
| 5,968,287 A | | 10/1999 | Nath |
| 2001/0011832 A1 | * | 8/2001 | Ehrlich et al. ............... 296/181 |

OTHER PUBLICATIONS

"Hydrocerol®Chemical Foaming and Nucleating Agents,"Foam Profile Extrusion—Processing and Information Guide of Clariant.

"Blowing Agent" by Rhomie L. Heck III, Modern Plastics, B–26 to B–32, Mid–Nov. 1999.

* cited by examiner

Primary Examiner—Blaine Copenheaver
Assistant Examiner—Leanna Roché
(74) Attorney, Agent, or Firm—Hunton & Williams; Glenn E. Klepac

(57) ABSTRACT

The present invention relates to an improved composite panel that is suitable for architectural and display applications and an advantageous method for making the composite panel. The composite panel comprises a foamed plastic core and two metallic skin layers bonded to the plastic core. The composite panel exhibits an effective bond strength sufficient to prevent peeling of the skin layers under normal use conditions, at least one visually flat surface substantially free of surface defects, and a stiffness to weight ratio of at least about 500 $lb_f\text{-}in/lb_m/ft^2$.

4 Claims, 2 Drawing Sheets

COMPOSITE PANEL WITH A FOAMED PLASTIC CORE

FIELD OF THE INVENTION

The present invention relates generally to a composite panel material that is suitable for architectural applications. More particularly, it relates to an improved composite panel that includes two skin layers bonded to an expanded or foamed plastic core. The present invention further relates to an advantageous method for making the improved composite panel.

BACKGROUND OF THE INVENTION

Composite panels made by laminating a solid (non-foamed), thermoplastic core between two thin sheets of metal are well known materials. They are used primarily for architectural and display applications, such as wall coverings and roofing. An example of such composite panels is REYNOBOND® Aluminum Composite Material, available from Reynolds Metals Company, that is made of two strong sheets of corrosion-resistant aluminum bonded to a solid, low density polyethylene core. Desirable characteristics of composite panels suitable for architectural applications include high stiffness to weight ratio, high bond strength between the metal and the plastic core, and visually flat surfaces. Improvement in any one of these characteristics would result in an improved composite panel provided that the other characteristics are not compromised.

Foamed plastic products are products in which there is a cellular structure. They are generally composed of two phases, a solid phase, i.e., the plastic matrix, and a vapor phase, i.e., the vapor inside the cells. The foam structure can be either open-celled or closed-celled. Open-celled foams have cells that are interconnected, in which the vapor inside can pass freely between the cells. Closed-celled foams have cells that are separated by cell walls and each cell is completely enclosed. Many foamed polymers are known with weight reductions ranging from solid down to 1–2% of the original polymer density.

Methods relating to the expansion of polyethylene resins are disclosed in U.S. Pat. Nos. 3,098,831; 4,473,516; 4,552,708; 4,738,810; and 4,952,352. In general, these references teach methods of expanding a low density polyethylene starting material employing both blowing and cross-linking agents.

U.S. Pat. No. 4,473,516 discloses a method directed to making a foamed thermoplastic article substantially free from surface imperfections by providing a non-foamed molded surface with a foam core.

SUMMARY OF THE INVENTION

It is an object of the present invention to provide an improved composite panel that exhibits a higher strength to weight ratio than prior art composite panels.

It is another object of the present invention to provide an improved composite panel that exhibits acceptable bond strength, and a visually flat surface at least equal to those of prior art composite panels.

It is yet another object of the present invention to provide an advantageous method for making the improved composite panel that is economical and results in consistent quality product.

According to one object of the present invention, an improved composite panel comprises a plastic core made from a foamed plastic and at least one skin layer bonded to the plastic core. Examples of suitable foamed plastics include foamed polyethylene, foamed polystyrene, foamed polypropylene, foamed polyvinyl chloride (PVC), foamed polyphenylene-oxide, and copolymers or terpolymers thereof. Within these plastics grades providing higher rigidity foam are preferred. The skin layer is preferably a metallic material. Examples of suitable metallic materials include aluminum alloys, galvanized steel, carbon or stainless steel, copper, titanium, and zinc. Any chemical, or mechanical means, or any combination thereof can be used to bond the skin layer to the plastic core. Preferably, both chemical and mechanical means are employed for enhanced bonding such as, for example, providing an adhesive film layer between the skin layer and the plastic core, and laminating the skin layer with the plastic core at an effective temperature and pressure.

According to another object of the present invention, an improved composite panel comprises a plastic core made from a foamed plastic and two skin layers made from a metallic material. The composite panel exhibits an effective bond strength sufficient to prevent peeling of the skin layers under normal use conditions, at least one visually flat surface substantially free of visual surface defects, and sufficient stiffness to weight ratio preferably at least about 500 $lb_f$-in/$lb_m$/$ft^2$, and more preferably of about 1000 $lb_f$-in/$lb_m$/$ft^2$. Preferably, the composite panel should exhibit a bond strength of at least about 20 in-lb/in, and more preferably at least about 40 in-lb/in.

The present invention further relates to an advantageous method for making the composite panel that includes mixing an effective amount of an encapsulated blowing agent, preferably a chemical blowing agent, with a plastic resin to form a mixture, extruding the mixture at an effective temperature and pressure to form a foamed sheet, and cooling gradually the extruded sheet of expanded plastic resin to form a sheet of foamed plastic having sufficiently flat and smooth surfaces, and a density reduction of from about 10 to about 45 percent, preferably from about 20 to about 45 percent and more preferably from about 30 to about 40 percent, compared to the density of the solid, non-foamed plastic. The method further includes bonding a metallic sheet to the sheet of foamed plastic.

These and other objects and advantages of the present invention will become more readily apparent to those skilled in the art when a detailed description of the preferred embodiments is read in conjunction with the attached drawing figures.

DETAILED DESCRIPTION OF THE INVENTION

The present invention provides an improved composite panel comprising a foamed plastic core. Foaming the core reduces the overall weight of the composite panel, however, it tends to have two opposing effects on bond strength. On one hand the reduction of material tends to weaken the bond strength. On the other hand, the foam's cellular structure tends to spread the separation forces through a larger volume of core, thus reducing the stress at any one point and producing a tougher bond. It has been discovered that foamed materials made from generally stronger, tougher polymers than LDPE and having a proper combination of density reduction and a fine, uniform cellular structure, exhibit equal or higher bond strengths with the metallic skin layers than solid LDPE.

Moreover, uneven foaming produces rough or uneven core sheet surfaces that in turn prevents the production of acceptably flat composite panels. Producing a foamed sheet with a quality suitable for the composite panel of the present invention requires careful selection of the starting materials, processing equipment, of the extrusion temperatures and pressures, and of the cooling process. More specifically, acceptable foam sheet can be produced by employing unexpectedly low extruder exit pressures, very low extrusion temperatures, and a very gradual cooling of the foamed sheet length. The cooled foamed sheet can be handled and laminated like conventional LDPE core. The composite panel of the present invention has lighter weight, improved flexural modulus, and at least as good bond strength as conventional composite panels with solid LDPE-core.

Figure 1:
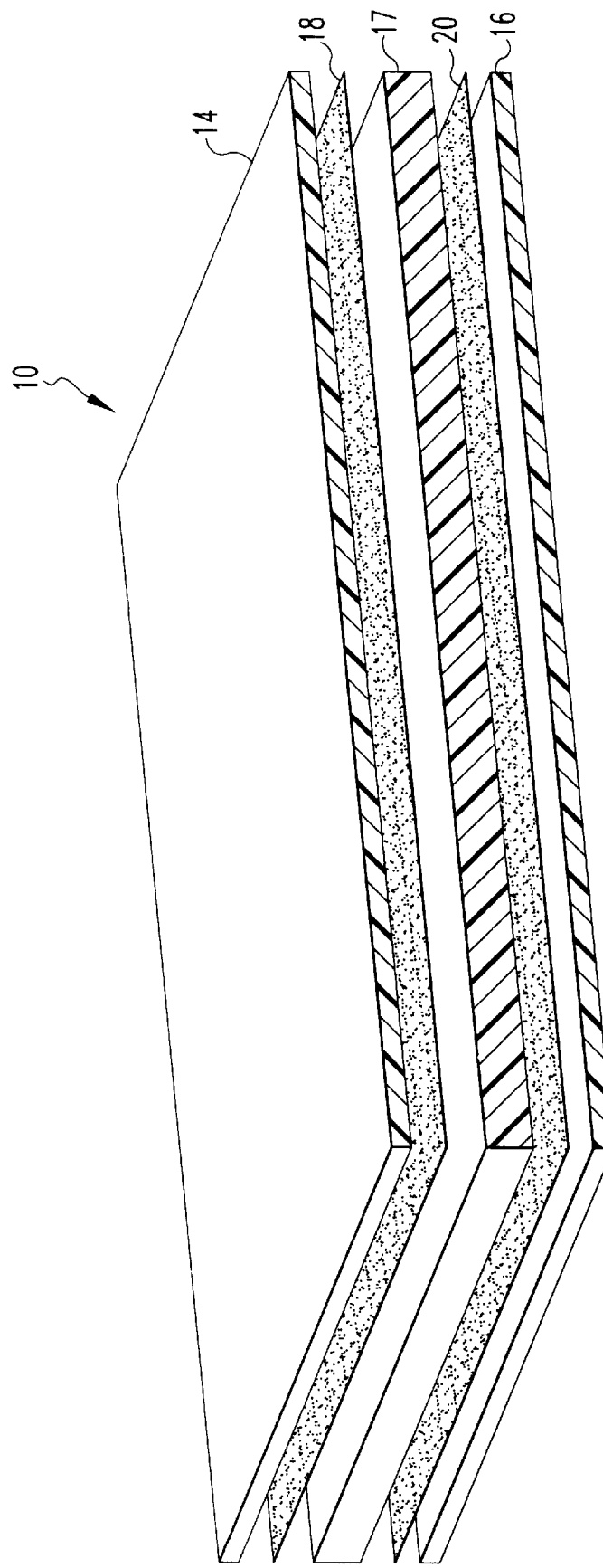
FIG. 1 is an exploded, perspective view of a composite panel, according to a preferred embodiment of the invention.

Referring to FIG. 1, a preferred embodiment of the present invention composite panel is provided. The composite panel 10 comprises a plastic core 12 situated between two outer skin layers 14 and 16. Adhesive film layers 18 and 20 are provided between the plastic core 12 and outer layers 14 and 16, respectively, for bonding the outer layers 14, 16 to the plastic core 12.

The plastic core is a foamed plastic. Examples of suitable foamed plastics include foamed plastics made from polyethylene, polystyrene, polypropylene, polyvinylchloride (PVC), polyphenylene-oxide, and copolymers or terpolymers thereof. Producing an expanded polymer foam with a quality suitable for the composite panel of the present invention requires careful selection of starting materials, process equipment, and the temperature and pressure parameters in the extrusion. Preferably, the foamed plastic core is made from a rigid base plastic material such as HDPE and rigid PVC, and more preferably from HDPE. The foamed plastic can be made by adding an effective amount of a thermoplastic blowing agent such as azodicarbonamide 5-phenyltetrazole, and p-toluene sulfonyl semicarbazide to the plastic resin prior to extrusion. Preferred agents for making foamed HDPE are traded under the names HYDROCEROL®, BIH, HYDROCLEROL® BIH 256, and HYDROCEROL® CF available by Clariant, located in Winchester, Va. Preferably, the blowing agent is used in an amount of from about 0.1 to about 2.0 percent by weight based on the weight, more preferably from about 0.3 to about 0.8 percent by weight based on the weight of the plastic. Preferably, the blowing agent is encapsulated in the form of a pelletized compound together with a carrier-based resin. Encapsulating the blowing agent allows the blowing agent to be evenly blended with the plastic resin. Preferably, the decomposition temperature of the pelletized blowing agent is lower than the processing temperature of the plastic, and controls the expansion of the plastic. As the mixture of the polyethylene resin and the blowing agent is heated just prior to extrusion, the blowing agent decomposes and releases gases such as nitrogen or carbon dioxide that cause the formation of uniformly dispersed bubbles or cells within the resinous melt stream. Expansion of the gases is suppressed until the melt stream exits the extruder. At that juncture, because of the pressure reduction and change in ambient temperature, the expansion occurs.

To achieve best results the encapsulated blowing agent should be thoroughly mixed and dispersed with the plastic. Also, the melt should be maintained under pressure to prevent expansion of the foam prior to the melt exiting the die. It has been unexpectedly discovered that combining low extruder pressure, and temperature results in a foam sheet that has sufficiently flat surfaces. Specifically, the extruder exit pressure should be maintained at about 500 psi or lower, preferably less than about 300 psi, and more preferably from about 100 to about 200 psi. Moreover, the temperature of the melt just at the die lip should be less than about 500° F. (260° F.), preferably from about 300° F. (149° F.) to about 500° F., more preferably from about 360° F. (182° F.) to about 420° F. (216° F.), and most preferably from about 380° F. (193° F.) to about 410° F. (210° F.).

The formed foamed sheet should also be cooled in a controlled, and gradual manner, for example, by contacting a series of cooling rolls maintained at individually controlled temperatures. As the molten stream exits the die lip into ambient air, both the released gases and the resinous melt stream experience an immediate cooling effect along with a low pressure environment which causes the resin to swell. At this point, the finished sheet thickness is established using conventional methods. Preferably, the finished sheet thickness may vary from about 1.0 mm to about 10.0 mm, more preferably from about 1.5 mm to about 5.5 mm. Other modifying materials, such as conventional dyes, pigments and anti-static compounds, may be incorporated into the starting polyethlene material, by mixing prior to extrusion.

The expanded foam has a weight-to-volume ratio as much as about 45 percent less than that of a comparably-sized specimen of a conventional non-foamed, polyethylene. Preferably, the starting plastic resin is a high-density polyethylene resin having a melt index (MI) of from about 0.5 to about 25, more preferably from about 3 to about 7 grams per 10 minutes, and a density of from about 0.95 to about 0.97 grams per cubic centimeter. Generally, polyethylene resins having a density of higher than about 0.97 grams per cubic centimeter are difficult to process. On the other hand, polyethylene resins with density lower than about 0.95 grams per cubic centimeter result in a composite panel having insufficient rigidity. The foaming of the plastic resin such as the HDPE resin is controlled to form a foam having a fine cellular structure with a cell size of from about 30 to about 300, and more preferably from about 50 to about 150 microns.

Preferably, the outer skin layers 14, 16 are made of metallic materials. Examples of suitable metallic materials include aluminum alloys, galvanized steel, carbon or stainless steel, copper, titanium and zinc. More preferred are corrosion-resistant aluminum alloys such as aluminum alloys AA3003, AA3004, or AA3105. Other metals or metal alloys can be used depending on the requirements of each specific application. Preferably, the outer layers have a thickness from about 0.2 to about 1.0, and more preferably from about 0.2 to about 0.5 mm. The outer layers can be covered with coatings such as paint coatings, or other protective coatings such as high-built fluoropolymers, metallic, acrylics, polyesters, and modified urethanes.

The adhesive layers 18 and 20 are preferably made of a carboxylic acid-modified polyethylene adhesive resin. Modification with a carboxylic acid is preferably effected with maleic-anhydride. Examples, of preferred commercially available products, that can be used to make the adhesive layers 18 and 20, include MODIC®, ADMER®, available by Mitsubishi Petrochemical Corp., Ltd., Bynel® available by E.I. DuPont de Nemours, Inc., and Plexar® available by Equistar Chemicals, L.P. Most preferred adhesives are Plexar®, and Bynel®.

The thickness of the adhesive layers 18 and 20 may range from about 0.02 to about 0.12, more preferably from about 0.05 to about 0.08 mm.

The overall thickness of the panel may range from about 1.5 to about 11.0, and more preferably from about 2.0 to about 6.0 mm, generally depending upon the load requirements of the application and the materials used. The present invention composite panel is advantageous because it exhibits an improved stiffness to weight ratio compared to conventional panels employing non-foamed (solid) plastic materials. Moreover, the composite panel exhibits acceptable flatness and bonding characteristics which are at least equal to conventional composite panels. The composite panel of the present invention can be formed into a variety of shapes having different lengths, widths and thicknesses.

Figure 2:
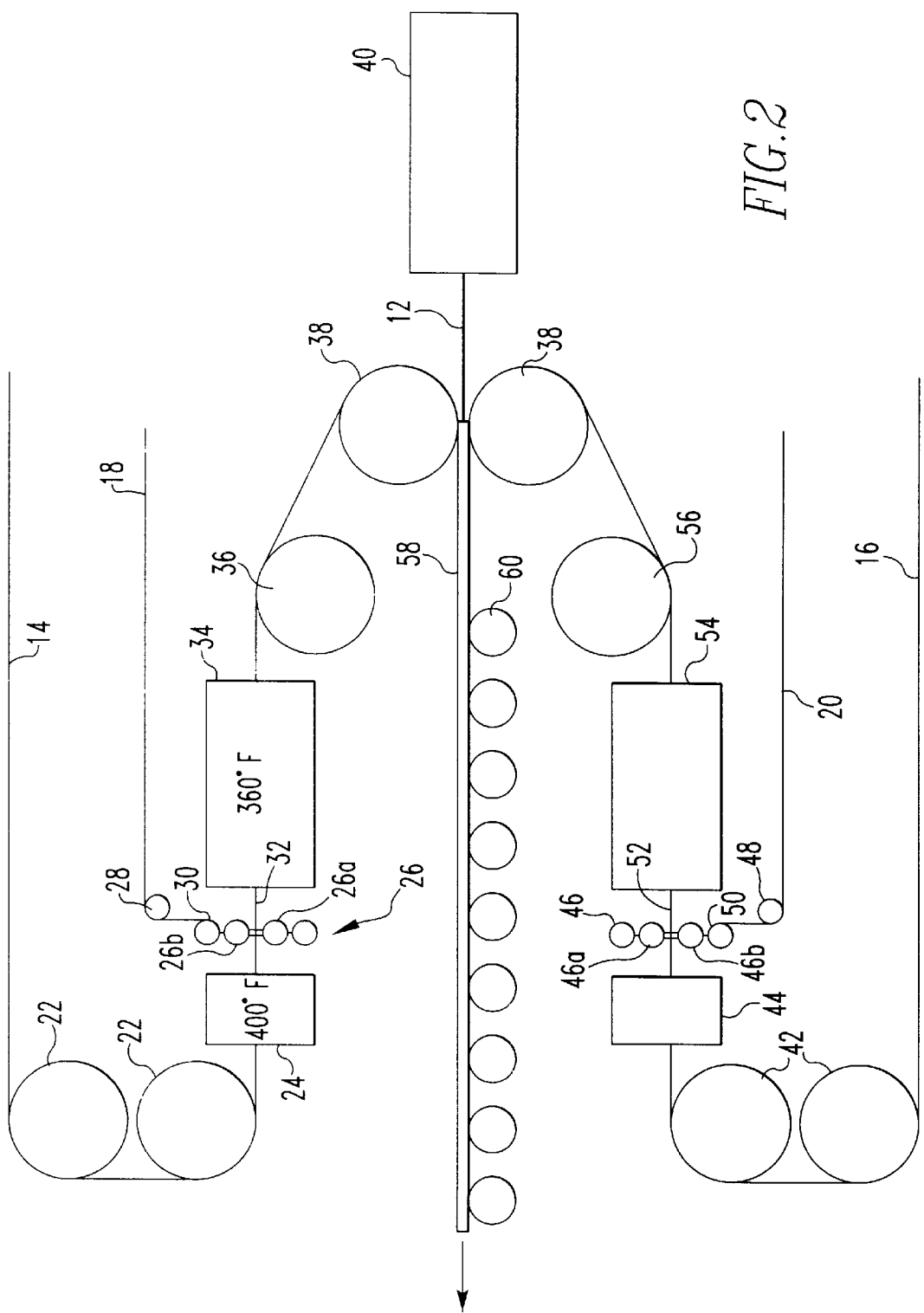
FIG. 2 is a simplified flow diagram of a lamination process for preparing the composite panel of FIG. 1, according to a preferred embodiment of the invention.

Referring to FIG. 2, a preferred laminating process for bonding the skin layers to the plastic core is provided. A metal sheet 14 having a thickness of from about 0.2 to about 0.5 mm., and a width of from about 1.0 to about 2.0 meters is transferred via steering rolls 22 to a preheated oven 24 where it is heated to a temperature of from about 280° F. (138° C.) to about 400° F. (204° C.). The metal sheet 14 can be formed using well-known processes and equipment. For example, the metal sheet 14 is made from a corrosion-resistant aluminum alloy like the ones employed in the REYNOBOND® ACM of Reynolds Metals Company. Examples of the processes that can be employed to snake the metal sheet 14 are described in U.S. Pat. No. 4,157,422, U.S. Pat. No. 5,503,689, and U.S. Pat. No. 5,480,498, which are assigned to the assignee of the present invention, aid which are incorporated herein for all purposes to the extent that are not inconsistent with the disclosure and claims of the present invention. The sheet 14 is then guided to an adhesive applicator 26 comprising two nip rolls 26a and 26b. An adhesive layer 18 is also guided to the adhesive applicator 26 through rolls 28 and 30. The nip rolls 26a and 26b press the adhesive layer 18 onto the hot metal sheet 14 to form a sheet 32. Sheet 32 is transferred through a main oven 34 where it is heated to a temperature of from about 340° F. (171° C.) to about 380° F. (193° C.). An oil heated rolls 36 guides the heated sheet 32 through nip rolls 38 on top of a sheet 12 of a plastic core material. Sheet 12 of the plastic core material is made of an expanded foam material preferably having a thickness of from about 1.5 to 5.0 mm. Sheet 12 is heated in oven 40 to a temperature of from about 200° F. (93° C.) to about 220° F. (104° C.) before reaching the nip rolls 38. A second metal sheet 16 is guided through steering rolls 42 to a preheated oven 44 and to a second adhesive applicator 46 where it is combined with a second adhesive layer 20 The adhesive layer 20 is guided to the adhesive applicator 46 via rolls 48 and 50. Adhesive applicator 46 includes nip rolls 46a and 46b that press die adhesive layer 20 onto die hot metal sheet 16 to form sheet 52. Sheet 52 is then heated in oven 54 and transferred via oil heated rolls 56 to the nip rolls 38 underneath sheet 12. The nip rolls 38 apply an effective pressures typically from about 50 to 150 lb./linear inch to sufficiently bond sheets 32 and 52 to the sheet 12 to form a strong composite sheet 58. The sheet 58 is transferred via conveyor 60 to a finishing product section 62.

The invention will become more apparent when considered together with the 20 following examples, which are set-forth as being merely illustrative of the invention and are not intended to be limiting. The scope of the invention is to be determined from the claims appended thereto.

EXAMPLES

Example 1

A composite panel for architectural panels was made having a plastic core made from an expanded, HDPE foam, two skin layers, and an adhesive layer between each skin layer and the core.

The foam was made by first thoroughly mixing HYDROCEROL® CF with HDPE in an amount of about 0.5 percent by weight based on the amount of the HDPE. The HDPE had a MI of about 5 grams per 10 minutes and a density of about 0.96 grams per cubic centimeter. The mixture was then extruded using a twin screw extruder, Model ZE 110Ax24 D-UT made by Berstorff GmbH, Hannover, Germany.

The extruder used two co-rotating conventional polyolefin processing screws. The screw design contained a low-pressure vent section, but the vent was plugged for foam production. Extruder discharge was into the suction section of a gear pump that boosted melt pressure and stabilized flow before discharging the melt into a conventional sheet die.

The molten mixture was maintained inside the extrude under conventionally low pressure and temperature. The extruder exit pressure was maintained at about 150 psi while the melt temperature just prior to reaching the die was maintained at about 390° F. (199° F.). The melt pump pressure was maintained at about 1800 psi to fill and pressurize the die and equalize the flow through the die.

As the molten stream exited the die it was cooled in a controlled manner by transferring it over five cooling rolls. The cooling rolls were maintained at a temperature of about 226° F. (108° C.), 234° F. (112° C.), 239° F. (115° C.), 230° F. (110° C.), and 185° F. (85° C.), respectively, with the cooler roll positioned closer to the die. As the molten material exited the die a foam was produced with a fine void structure having an average cell size of about 100 microns and a weight reduction of about 40% of the solid polymer. The thickness of the foam was controlled by selecting the size of the opening of the die, the size of the opening between the first two rolls, and the take away speed controlled by a puller relative to the extrusion speed.

The skin layers were made from a corrosion resistance aluminum alloy material traded under the name AA 3105 which is available in sheet form. The aluminum sheet had a thickness of about 0.25 mm and a width of about 1250 mm.

The adhesive was a maleic anhydride-modified adhesive polyethylene resin traded under the name Plexarg available by Equistar Chemicals, LP. The adhesive was formed by extrusion into two film layers each layer having a thickness of about 3 mils and a width of about 1500 mm.

The various layers were bonded together in a conventional laminating press employing a temperature of about 347° F. (175° C.), and a pressure of about lb/linear inch.

The composite panel exhibited a visually flat surface, substantially free of visual defects, acceptable bond strength, and excellent stiffness to weight ratio. The stiffness to weight ratio is the ratio of the product of the moment of inertia and the flexural modulus to the overall weight of the composite panel.

Example 2

The composite panel as in example 1, except that the skin layers were made from galvanized steel. The composite panel exhibited a visually flat surface, substantially free of visual defects, acceptable bond strength, and excellent stiffness to weight ratio.

Example 3

The composite panel as in example 1, except that skin layers were made from 0.5 mm thick AA 3105. The composite panel exhibited a visually flat surface, substantially free of visual defects, acceptable bond stiffness, and excellent stiffness to weight ratio.

Example 4

The composite panel as in example 1, except that the foam material is made from a 10 MI starting polyethylene resin. The composite panel exhibits a visually flat surface, substantially free of visual defects, acceptable bond strength, and excellent stiffness to weight ratio.

Example 5

The composite panel as in example 1, except that the foam material is made from a HDPE having a density of about 0.97 grams per cubic centimeter. The composite panel exhibits a visually flat surface, substantially free of visual defects, acceptable bond strength, and excellent stiffness to weight ratio.

Example 6

The composite panel as in example 1, except that the foam material is made from a HDPE having a density of about 0.95 grams per cubic centimeter. The composite panel exhibits a visually flat surface, substantially free of visual defects, acceptable bond strength, and excellent stiffness to weight ratio.

Example 7

The composite panel as in example 1, except that the foam material is made by keeping the extruder exit pressure at about 200 psi and the melt temperature just prior to reaching the die at about 410° F. (210° C.).

The composite panel exhibits a visually flat surface, substantially free of surface defects, acceptable bond strength, and excellent stiffness to-weight ratio.

Example 8

The composite panel as in example 1, except that the foam material is made by keeping the extruder exit pressure at about 300 psi and the melt temperature just prior to reaching the die lip at about 390° F. (198° C.).

The composite panel exhibits a visually flat surface, substantially free of visual defects, acceptable bond strength, and excellent stiffness to weight ratio.

We claim:

1. A composite panel having a stiffness to weight ratio of at least about 500 $lb_f$-in/$lb_m$ft$^2$ and comprising
   a) a formed plastic core having a thickness of about 1–10 mm. and comprising foamed HDPE having a fine cell structure with an average cell size from about 30 microns to about 300 microns,
   b) first and second skin layers each comprising an aluminum alloy sheet having a thickness of about 0.2 to 0.5 mm., said skin layers being adhered to opposed sides of said core by a layer of adhesive so that said composite panel exhibits a bond strength of at least about 40 in-lb/in.

2. A composite panel of claim 1, wherein each said adhesive layer comprises a carboxylic acid modified polyethylene.

3. A composite panel of claim 1, wherein said composite panel exhibits at least one visually flat surface free of visual defects.

4. A composite panel of claim 1, wherein said foamed HDPE has a density reduction of about 10–45 percent.

* * * * *